United States Patent
Liu et al.

(10) Patent No.: US 11,886,352 B2
(45) Date of Patent: Jan. 30, 2024

(54) ACCESS FRIENDLY MEMORY ARCHITECTURE OF GRAPH NEURAL NETWORK SAMPLING

(71) Applicant: T-Head (Shanghai) Semiconductor Co., Ltd., Shanghai Free Trade Area (CN)

(72) Inventors: Heng Liu, Shanghai (CN); Tianchan Guan, Shanghai (CN); Shuangchen Li, Sunnyvale, CA (US); Hongzhong Zheng, Los Gatos, CA (US)

(73) Assignee: T-Head (Shanghai) Semiconductor Co., Ltd., Shanghai Free Trade Area (CN)

( * ) Notice: Subject to any disclaimer, the term of this patent is extended or adjusted under 35 U.S.C. 154(b) by 0 days.

(21) Appl. No.: 17/581,609

(22) Filed: Jan. 21, 2022

(65) Prior Publication Data

US 2023/0153250 A1 May 18, 2023

(30) Foreign Application Priority Data

Nov. 15, 2021 (CN) .......................... 202111346570.2

(51) Int. Cl.
*G06F 12/1027* (2016.01)
*G06N 3/063* (2023.01)
*G06F 12/02* (2006.01)

(52) U.S. Cl.
CPC ...... *G06F 12/1027* (2013.01); *G06F 12/0238* (2013.01); *G06N 3/063* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 9,076,107 | B2 | 7/2015 | Cameron et al. |
| 11,360,892 | B2 * | 6/2022 | Sahin .................. G06F 12/0862 |
| 2019/0325309 | A1 | 10/2019 | Flamant |
| 2020/0034713 | A1 | 1/2020 | Golovashkin et al. |
| 2020/0279151 | A1 | 9/2020 | Li et al. |
| 2020/0293838 | A1 | 9/2020 | Li et al. |
| 2021/0049467 | A1 | 2/2021 | Riedmiller et al. |
| 2021/0192321 | A1 | 6/2021 | Zhang |
| 2021/0192358 | A1 | 6/2021 | Song et al. |
| 2021/0241111 | A1 | 8/2021 | Liu et al. |
| 2021/0272018 | A1 | 9/2021 | Casas et al. |
| 2021/0319324 | A1 | 10/2021 | Mueller et al. |
| 2021/0326389 | A1 | 10/2021 | Sankar et al. |
| 2021/0374143 | A1 | 12/2021 | Neill |
| 2023/0013870 | A1 * | 1/2023 | Hashimoto .......... G06N 3/0455 |
| 2023/0162024 | A1 * | 5/2023 | Wang ...................... G06N 3/08 |
| | | | 706/19 |

* cited by examiner

Primary Examiner — Stephanie Wu

(57) ABSTRACT

This specification describes methods and systems for accelerating attribute data access for graph neural network (GNN) processing. An example method includes: receiving a root node identifier corresponding to a node in a graph for GNN processing; determining one or more candidate node identifiers according to the root node identifier, wherein attribute data corresponding to the one or more candidate node identifiers are sequentially stored in a memory; and sampling one or more graph node identifiers at least from the one or more candidate node identifiers for the GNN processing.

20 Claims, 10 Drawing Sheets

ACCESS FRIENDLY MEMORY ARCHITECTURE OF GRAPH NEURAL NETWORK SAMPLING

CROSS REFERENCE TO RELATED APPLICATIONS

This application claims priority to and benefits of Chinese patent Application No. 202111346570.2, filed with the China National Intellectual Property Administration (CNIPA) on Nov. 15, 2021. The entire contents of the above-identified application are incorporated herein by reference.

TECHNICAL FIELD

This specification relates to the field of memory architecture, and in particular, to memory architecture for optimizing memory access efficiency in Graph Neural Networks (GNNs).

BACKGROUND

While traditional deep learning models are good at pattern recognition and data mining by capturing hidden patterns of Euclidean data (e.g., images, text, videos), Graph neural networks (GNNs) have shown to extend the power of machine learning to non-Euclidean domains represented as graphs with complex relationships and interdependencies between objects. Research has shown that GNNs can exceed state-of-the-art performance on applications ranging from molecular inference to community detection.

GNNs can be a very effective model for unstructured data modeling and processing. Recently, GNNs are becoming more and more utilized in applications such as recommendation systems, risk control systems, etc. Graph data may be unstructured. As a result, accessing graph data may result in random memory accesses.

SUMMARY

Embodiments of this specification provide a computer-implemented method, comprising: receiving a root node identifier corresponding to a node in a graph for graph neural network (GNN) processing; determining one or more candidate node identifiers according to the root node identifier, wherein attribute data corresponding to the one or more candidate node identifiers are sequentially stored in a memory; and sampling one or more graph node identifiers at least from the one or more candidate node identifiers for the GNN processing.

In some embodiments, the determining one or more candidate node identifiers according to the root node identifier further comprises: determining a plurality of adjacent node identifiers in the graph according to the root node identifier; obtaining physical addresses of the plurality of adjacent node identifiers in the memory; identifying one or more candidate physical addresses according to the physical addresses, wherein the one or more candidate physical addresses are sequential in the memory; and determining the one or more candidate node identifiers according to the one or more candidate physical addresses.

In some embodiments, the identifying one or more candidate physical addresses according to the physical addresses comprises: identifying the one or more candidate physical addresses from which attribute data corresponding to the one or more candidate physical addresses are retrieved in one read operation on the memory.

In some embodiments, the method further comprises: determining a number of sampled node identifiers whose attribute data is stored in a bank of the memory; determining whether the number of sampled node identifiers whose attribute data is stored in the bank exceeds a selection threshold of the bank; and in response to determining that the number of sampled node identifiers in the bank exceeds the selection threshold of the bank, setting an invalid flag to avoid more node identifiers to be sampled from the bank of the memory.

In some embodiments, the determining a number of sampled node identifiers whose attribute data is stored in a bank of the memory comprises: determining the number of sampled node identifiers whose attribute data is stored in the bank by reading a counter register for the bank; and the method further comprises: updating the counter register for the bank in response to a node identifier from the bank being sampled.

In some embodiments, the determining whether the number of sampled node identifiers whose attribute data is stored in the bank exceeds a selection threshold of the bank comprises: determining, for a plurality of banks that includes the bank, a plurality of counter registers, wherein each of the plurality of counter registers corresponds to one of the plurality of banks; determining a minimum value from the plurality of counter registers; and determining whether a difference between the number of sampled node identifiers and the minimum value exceeds the selection threshold of the bank.

In some embodiments, the sampling one or more graph node identifiers comprises: sampling one or more positive node identifiers that are within a preset distance from the root node; and sampling one or more negative node identifiers that are outside the preset distance from the root node.

In some embodiments, the preset distance is one.

In some embodiments, the memory comprises a Double Data Rate (DDR) Synchronous Dynamic Random Access Memory (SDRAM).

Embodiments of this application specification further provide a system for accelerating GNN attribute access, comprising: a memory configured to store attribute data of graph nodes in a graph; and a GNN processor is configured to: receive a root node identifier corresponding to a node in the graph for GNN processing; determine one or more candidate node identifiers according to the node identifier, wherein attribute data corresponding to the one or more candidate node identifiers are sequentially stored in the memory; and sampling one or more graph node identifiers at least from the one or more candidate node identifiers for the GNN processing.

Embodiments of this specification further provide one or more non-transitory computer-readable storage media storing instructions executable by one or more processors, wherein execution of the instructions causes the one or more processors to perform operations comprising: receiving a root node identifier corresponding to a node in a graph for graph neural network (GNN) processing; determining one or more candidate node identifiers according to the root node identifier, wherein attribute data corresponding to the one or more candidate node identifiers are sequentially stored in a memory; and sampling one or more graph node identifiers at least from the one or more candidate node identifiers for the GNN processing.

Embodiments of this specification further provide a GNN accelerating device, comprising: an obtaining module configured to receive a a root node identifier corresponding to a node in a graph for GNN processing; a determining module configured to determine one or more candidate node identifiers according to the root node identifier, wherein attribute data corresponding to the one or more candidate node identifiers are sequentially stored in a memory; and a sampling module configured to sample one or more graph node identifiers at least from the one or more candidate node identifiers for the GNN processing.

Embodiments of this specification further provide a GNN accelerating device, comprising: an obtaining module configured to obtain a root node identifier corresponding to a node in a graph for GNN processing; a sampling module configured to perform node sampling for the GNN according to a group of candidate node identifiers that are determined based on the root node identifier; a first determining module configured to determine a number of sampled node identifiers whose attribute data is stored in a bank of the memory; a second determining module configured to determine whether the number of sampled node identifiers whose attribute data is stored in the bank exceeds a selection threshold of the bank; and a setting module configured to, in response to a determination that the number of sampled node identifiers in the bank exceeds the selection threshold of the bank, setting an invalid flag to avoid more node identifiers to be sampled from the bank of the memory.

Embodiments of this specification provide systems and methods that improve memory access for GNN sampling. According to the systems and methods, candidate node identifiers may be determined with a goal to increase sequential accesses on a memory (e.g., a DDR) for the GNN sampling. For many types of the memory that allows a single read operation to extract a plurality of attribute data, having candidate node identifiers that are sequential to each other allows the attribute data corresponding to the candidate node identifiers to be extracted from the memory in a single read operation, hence improving the overall efficiency of the memory access in the GNN sampling. Moreover, bank counters may be used to keep track of the number of data to be accessed in each bank of the memory. With the assistance of the bank counters, the GNN sampling may be balanced to reduce or minimize bank conflicts on the memory, hence further improving the efficiency in memory access.

DETAILED DESCRIPTION

The following describes details of embodiments of this specification with reference to the accompanying drawings. The accompanying drawings show some embodiments of this specification, and this specification may be implemented in various manners and is not limited by the embodiments described herein. Rather, these embodiments are provided, so that this specification is more thoroughly understood and the scope of this specification is completely conveyed to a person skilled in the art.

In many embodiments, the steps of corresponding methods are not necessarily performed according to a sequence shown and described in this specification. In some other embodiments, the methods may include more or fewer steps than those described in this specification. In addition, a single step described in this specification may be divided into a plurality of steps for description in other embodiments, and a plurality of steps described in this specification may be combined into a single step for description in other embodiments.

Data may be structured or unstructured. For structured data, information may be arranged according to a pre-set data model or schema. For unstructured data, information may not be arranged using a preset-data model or a pre-defined manner. For example, a text file (e.g., emails, reports, etc.) may include information (e.g., individual letters or words) that does not have a pre-defined structure. As a result, the unstructured data may include irregularities and ambiguities that make it difficult to understand using traditional programs or data structures.

One way to represent unstructured data is by using graphs. A graph is a data structure comprising two components—nodes (or vertices) and edges. For example, a graph G may be defined as a collection of a set of nodes V and a set of edges E connecting the set of nodes. A node in a graph may have a set of features or attributes (e.g., a user profile in a graph representing a social network). A node may be defined as an adjacent node of another node, if they are connected by an edge. The graph may be a highly flexible data structure, as the graph may not require pre-defined rules to determine how many nodes it contains or how the nodes are connected by edges. Because the graph may provide great flexibility, it is one of the data structures that are widely used to store or represent unstructured data (e.g., text files).

Figure 1:
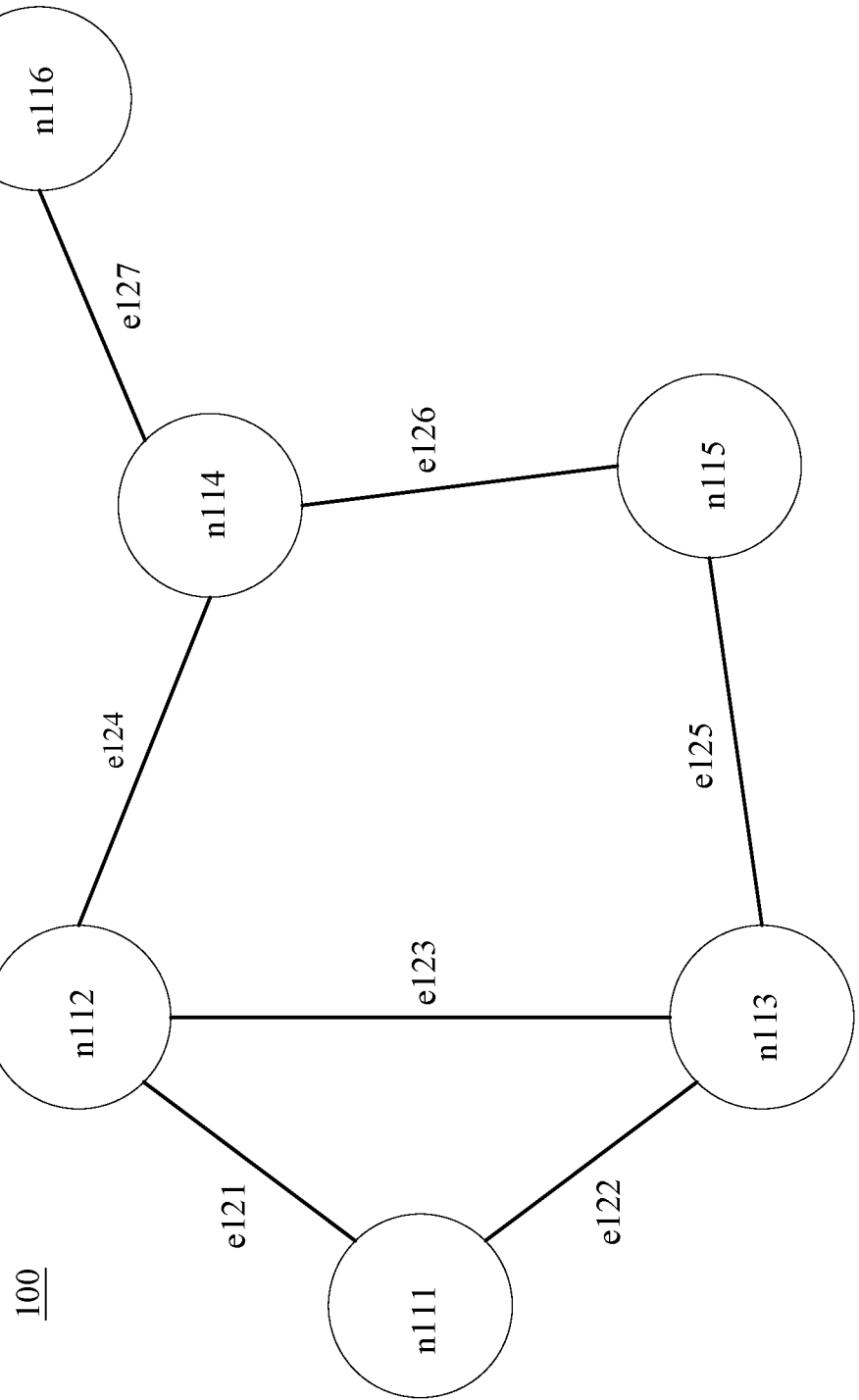
FIG. 1 is a schematic of an example graph, according to some embodiments of this specification.

FIG. 1 is a schematic of an example graph, according to some embodiments of this specification. As shown in FIG. 1, a graph 100 comprises nodes n111, n112, n113, n114, n115, and n116. Further, the graph 100 comprises edges e121, e122, e123, e124, e125, e126, and e127. Each of the nodes has one or more adjacent nodes. For example, nodes n112 and n113 are adjacent to node n111, since node n112 shares with node n111 edge e121 and node n113 shares with node n111 edge e122.

When storing a graph in computer memory, the nodes, edges, and attributes may be stored in many different data structures. One way to store a graph is to separate the attribute data from the corresponding nodes. For example, node identifiers may be stored in an array, with each node identifier providing an address or a pointer that points to the location of the attribute data for the corresponding node. The attributes for all nodes may be stored together, and they may be accessed by reading the address or the pointer stored in the corresponding node identifiers. By separating the attribute data from the corresponding nodes, the data structure may be able to provide faster traversing access on the graph.

A graph neural network (GNN) is a type of neural network that may directly operate on a graph. The GNN may be more suitable than traditional neural networks (e.g., a convolutional neural network) for operations on a graph, since the GNN may be better equipped to accommodate the arbitrary size of the graph or the complex topology of the graph. The GNN may perform inference on data described in graph formats. The GNN is capable of performing node-level, edge-level, or graph-level prediction tasks.

GNN processing may involve GNN training and GNN inference, both of which may involve GNN computations. A typical GNN computation on a node (or vertex) may involve aggregating its neighbor's (direct neighbors or each neighbor's neighbors) features and then computing new activations of the node for determining a feature representation (e.g., feature vector) of the node. Therefore, GNN processing for a small number of nodes often requires input features of a significantly larger number of nodes. Taking all neighbors for message aggregation is too costly since the nodes needed for input features would easily cover a large portion of the graph, especially for real-world graphs that are colossal in size (e.g., with hundreds of millions of nodes with billions of edges).

To make GNN more practical for these real-word applications, node sampling is often adopted to reduce the number of nodes to be involved in the message/feature aggregation. For example, positive sampling and negative sampling may be used to determine the optimization objective and the resulted variance in the GNN processing. For a given root node whose feature representation is being computed, the positive sampling may sample those graph nodes that have connections (direct or indirect) via edges with the root node (e.g., connected to and within a preset distance from the root node); the negative sampling may sample those graph nodes that are not connected via edges with the root graph node (e.g., outside of the preset distance from the root node). The positively sampled nodes and the negatively sampled nodes may be used to train the feature representation of the root node with different objectives.

Figure 2:
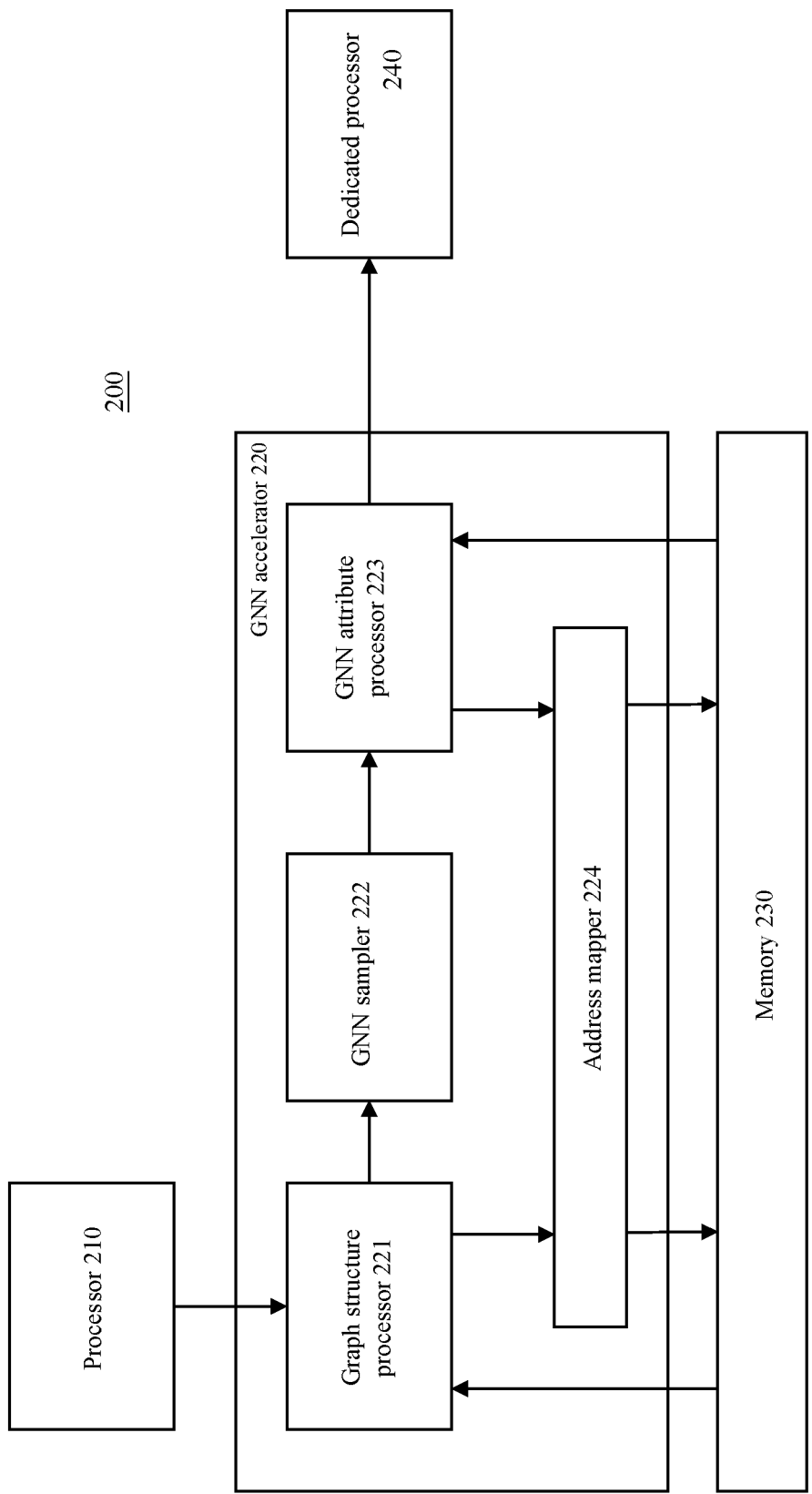
FIG. 2 is a schematic of an example system using GNN accelerator architecture, according to some embodiments of this specification.

To perform GNN, a system may retrieve graph data from a memory, and send the data to one or more processors for processing. FIG. 2 is a schematic of an example system using GNN accelerator architecture, according to some embodiments of this specification. As shown in FIG. 2, a system 200 comprises one or more processors 210, a GNN accelerator 220, a memory 230, and one or more dedicated processors 240. In some embodiments, the one or more processors 210 comprises one or more central processing units (CPU). In some embodiments, the one or more dedicated processors 240 may include one or more CPUs, one or more graphic processing units (GPU), one or more tensor processing units (TPU), one or more neural processing units (NPU), one or more dedicated graph neural network processing units, etc. In some embodiments, the memory 230 may include Synchronous Dynamic Random-Access Memory (SDRAM), such as a Double Data Rate (DDR) SDRAM.

As shown in FIG. 2, the GNN accelerator 220 may receive instructions and information on a GNN from the one or more processors 210, and extract data related to the GNN from the memory 230. After receiving the data from the memory 230, the GNN accelerator 220 may process the data, and send the processed data to the one or more dedicated processors 240 for processing.

In some embodiments, as shown in FIG. 2, the GNN accelerator 220 may include a graph structure processor 221, a GNN sampler 222, a GNN attribute processor 223, and an address mapper 224. The graph structure processor 221 may be configured to receive instructions and information on the GNN from the one or more processors 210, and fetch information on one or more root nodes and their edges from the memory 230. The graph structure processor 221 may then send the fetched information to the GNN sampler 222.

The GNN sampler 222 may be configured to select, according to the edge information of the one or more root nodes, one or more sampled nodes for GNN processing. In some embodiments, the GNN sampler 222 may select the one or more sampled nodes according to positive sampling or negative sampling. For example, based on the positive sampling, the one or more sampled nodes may be selected from nodes that have a connection via edges with the one or more root nodes (e.g., adjacent to the one or more root nodes). Based on the negative sampling, the one or more sampled nodes may be selected from nodes that are not directly connected via edges with the one or more root nodes (e.g., not adjacent or close to the one or more root nodes). In some embodiments, the positive sampling may select from the neighboring nodes of the root node that are connected to and within a preset distance from the root node. The connection may be a direct (one edge between the source node to the destination node) or indirect (multiple edges from the source node to the destination node) connection. The "preset distance" may be configured according to the implementation. For example, if the preset distance is one, it means only the directly connected neighboring nodes are selected for positive sampling. If the preset distance is infinity, it means that the nodes are not connected, whether directly or indirectly. The negative sampling may select from nodes that are outside the preset distance from the root node. It is appreciated that the sampled nodes may be selected using any algorithms other than the positive sampling and the negative sampling.

Having selected the sampled nodes, the GNN sampler 222 may send the selection information of the sampled nodes to the GNN attribute processor 223. Based on the information of the sampled nodes, the GNN attribute processor 223 may be configured to fetch from the memory 230 information of the sampled nodes. In some embodiments, the information of the sampled nodes may include one or more features or attributes of each of the sampled nodes (also called attribute data). The GNN attribute processor 223 may be further configured to send the fetched information of the sampled nodes and the information of the one or more root nodes and their edges to the dedicated processors 240. The dedicated processors 240 may perform GNN processing based on the information received from the GNN attribute processor 223.

In some embodiments, the graph structure processor 221 and the GNN attribute processor 223 may fetch information from the memory 230 using the address mapper 224. The address mapper may be configured to provide hardware address information in the memory 230 based on information of nodes and edges. For example, a root node as a part of an input GNN may be identified using an identifier n111 (e.g., node n111 of FIG. 1). If the graph structure processor 221 intends to fetch information of the node n111 (e.g., attribute data of the node n111), the graph structure processor 221 may provide the identifier n111 to the address mapper 224, and the address mapper 224 may determine a physical address in the memory 230 where the information for the node n111 (e.g., the attribute data of the node n111) is stored. In some embodiments, the address mapper 224 may also determine one or more physical addresses in the memory 230 where information on the edges of the node n111 is stored (e.g., edges e121 and e122 of FIG. 1).

As shown in FIG. 2, the processing of GNN involves fetching information on graphs, which may include unstructured data. The unstructured data may not be stored continuously in the memory 130. Moreover, the processing of GNN may involve fetching information on sampled nodes, and information of the sampled nodes may not be stored continuously in the memory 130. As a result, when the GNN accelerator 120 accesses the memory 130 to extract data for the GNN, the data accessing may result in random accesses. For example, a graph may include nodes and edges that do not have a pre-set structure, and the number of nodes and edges may be changed and updated on the graph. Therefore, to extract a particular set of data on a graph, such as a node and its neighbors and corresponding edges, the GNN accelerator 120 may need to go to many different locations in the memory 130 that are further apart.

Additional issues may arise when the memory 130 uses banks to store data. For example, the memory 130 may be a DDR, which stores data in banks. When the memory stores information in rows, columns, or memory pages, the rows, columns, and memory pages may be divided into a number of banks, with each bank storing a plurality of rows, columns, or memory pages. For the types of memories that store information in banks, a bank conflict may occur when a same bank is accessed continuously with random addresses. For example, if two consecutive accesses are on different rows in a same bank, these two accesses may not be performed simultaneously. In fact, for many types of memory (e.g., DDR), there may be multiple cycles of delays between each memory access on a same bank. For example, if a next memory access is on a different row in the same bank, the next memory access may need to wait for 12 cycles before it may be completed. As a result, bank conflicts may cause significant delays in the system. It is appreciated that bank conflicts are used merely as examples. Different types of memories may also suffer issues with conflicts in other subunits of memory. For example, a memory may also experience delays between each memory access on a same memory page. As a result, consecutive memory accesses on a same memory page may also result in delays and conflicts.

Figure 3:
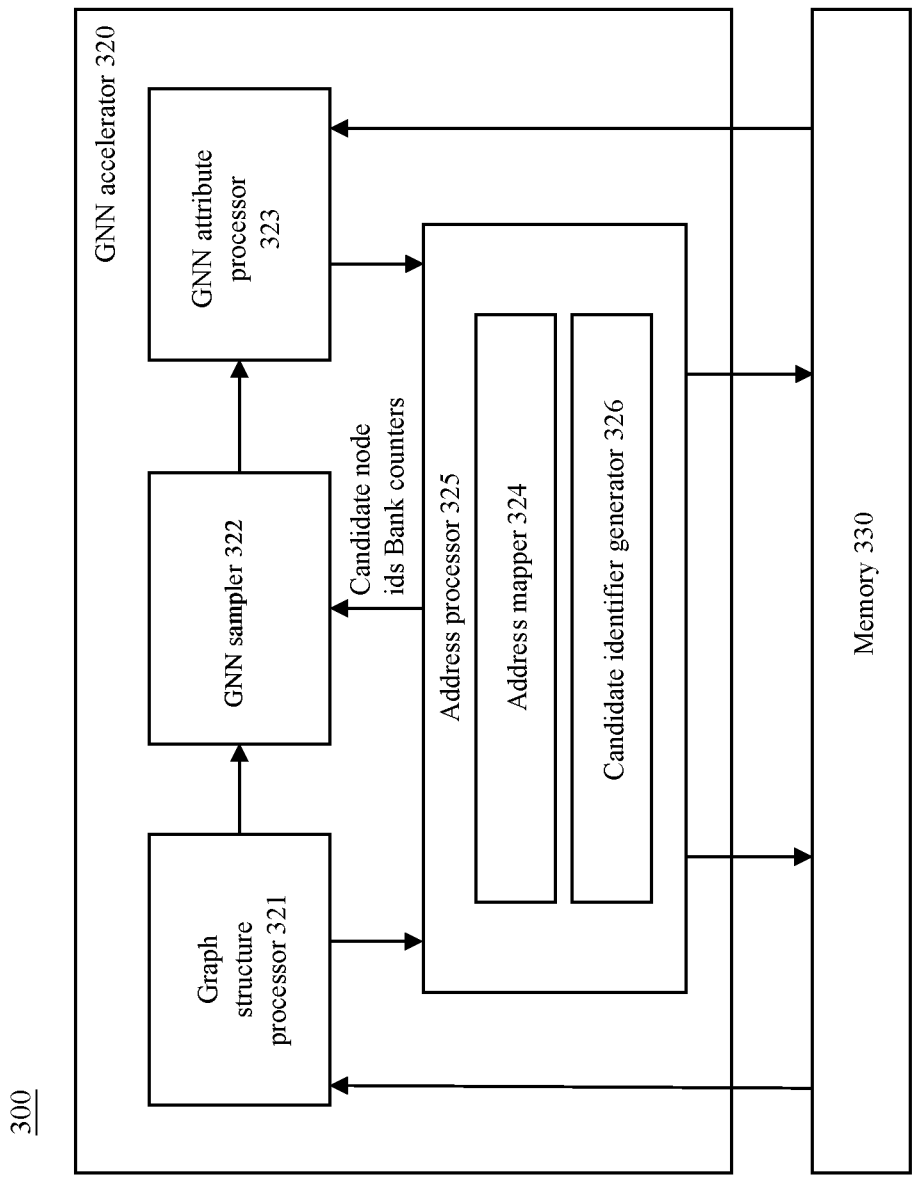
FIG. 3 is a schematic of an example improved system using GNN accelerator architecture, according to some embodiments of this specification.

To resolve the issues described above, embodiments of this specification provide novel systems and methods of accessing memory for unstructured data. FIG. 3 is a schematic of an example improved system using GNN accelerator architecture, according to some embodiments of this specification. As shown in FIG. 3, a system 300 may include a GNN accelerator 320 and a memory 330 (e.g., similar to memory 220 of FIG. 2). In some embodiments, the system 300 may further include one or more processors (e.g., similar to the one or more processors 210 of FIG. 2) and one or more dedicated processors (e.g., similar to the one or more dedicated processors 240 of FIG. 2). It is appreciated that FIG. 3 merely illustrates the hardware components related to the attribute data retrieval and storage, and depending on the implementation, the system 300 may include more, fewer, or alternative components for implementing other proper functionalities.

In some embodiments, GNN accelerator 320 may include a graph structure processor 321 (e.g., similar to the graph structure processor 221 of FIG. 2), a GNN sampler 322 (e.g., similar to the GNN sampler 222 of FIG. 2), a GNN attribute processor 323 (similar to the GNN attribute processor 223 of FIG. 2), and an address processor 325. In some embodiments, the address processor 325 may include a candidate identifier generator 326 and an address mapper 324 (e.g., similar to the address mapper 224 of FIG. 2).

In some embodiments, the address processor 325 is configured to generate candidate node identifiers that are beneficial for memory (e.g., DDR) traffic. Moreover, the address processor 325 may be configured to generate bank counters to keep track of numbers of accesses in each bank (e.g., a DDR bank). The information stored in the bank counters effectively help reducing bank conflicts in the memory 330.

In some embodiments, the address processor 325 is configured to send the generated candidate node identifiers or the bank counters to the GNN sampler 322. The GNN sampler 322 is configured to use the information from the candidate node identifiers or the bank counters to assist in performing node samplings, such as positive samplings or negative sampling.

Figure 4:
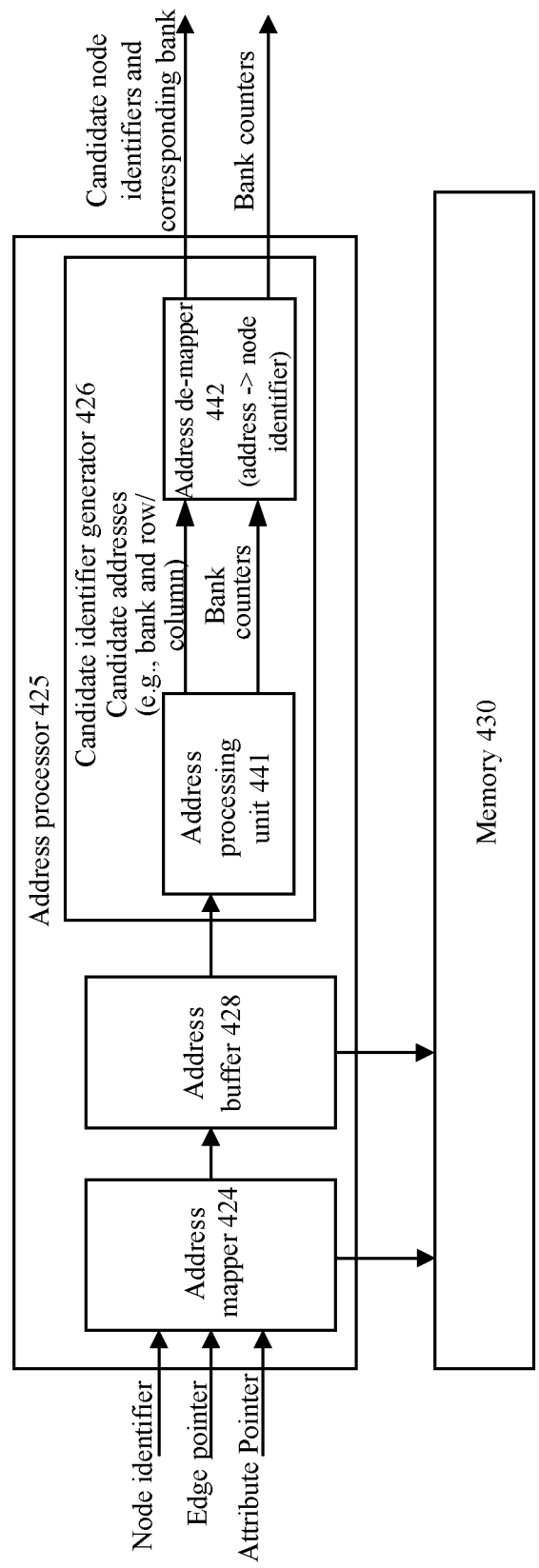
FIG. 4 is a schematic of an example address processor, according to some embodiments of this specification.

FIG. 4 is a schematic of an example address processor, according to some embodiments of this specification. As shown in FIG. 4, an address processor 425 may be similar to the address processor 325 shown in FIG. 3. In some embodiments, the address processor 425 may include a candidate identifier generator 426 (e.g., similar to the candidate identifier generator 326 shown in FIG. 3). A memory 430 may be similar to the memory 330 shown in FIG. 3. It is appreciated that FIG. 4 merely illustrates the hardware components related to the address processing, and depending on the implementation, the address processor 425 may include more, fewer, or alternative components for implementing other proper functionalities.

In some embodiments, the address processor 425 may include an address mapper 424 (e.g., similar to address mapper 324 of FIG. 3) and an address buffer 428. Similar to the address mapper 224 of FIG. 2, the address mapper 424 may be configured to provide hardware address information in the memory 430 based on node identifiers or edges. For example, as shown in FIG. 4, the address mapper 424 may receive information on nodes (e.g., node identifiers), edges (e.g., edge pointers), and attributes (e.g., attribute pointers). Using a node with an identifier n111 (e.g., node n111 of FIG. 1) as an example, the address mapper 424 may determine a physical address in the memory 430 where the information of the node n111 (e.g., attribute data for the node n111) is stored. In some embodiments, the address mapper 224 may also determine one or more physical addresses in the memory 430 where information on the edges of the node n111 is stored.

The address buffer 428 may be configured to store the physical addresses that are to be sent to the memory 430. It is appreciated that the address mapper 424, the address buffer 428, or both may access the memory 430.

The candidate identifier generator 426 may be configured to generate candidate node identifiers according to the physical addresses. The candidate node identifiers are node identifiers that may be sampled in processing the GNN. In some embodiments, if an address buffer (e.g., address buffer 428) is present in address processor 425, the candidate identifier generator 426 may be configured to generate candidate node identifiers according to the physical addresses stored in the address buffer. In some embodiments, the candidate node identifiers are generated with one or more goals. For example, one of the goals for generating the candidate node identifiers is to increase intra-bank sequential accesses (e.g., sequential accesses within each bank). When intra-bank sequential accesses are increased, the efficiency of memory access may be improved in the system. For example, when information of a node is being extracted from a memory, a single read on the memory may extract an entire row of data encompassing the information of the node. This single read operation within the bank may provide optimal memory access efficiency. As described above, non-sequential reads within a bank may lead to multiple read operations that have to be processed in series, which will cause delays and significantly impair memory access performance In addition, another of the goals for generating the candidate node identifiers is to balance inter-bank accesses (e.g., distributing the access among the banks in a balanced manner) to decrease the bank conflict, which can also improve the efficiency of memory access.

In some embodiments, the candidate identifier generator 426 may include an address processing unit 441 and an address de-mapper 442. In some embodiments, to increase sequential accesses in banks, the address processing unit 441 is configured to receive physical addresses (e.g., from address buffer 428) and generate candidate physical addresses according to the received physical addresses. In some embodiments, the received physical addresses may include physical addresses that store attribute data for nodes adjacent to the one or more root nodes. In some embodiments, the candidate physical addresses are generated with the goal to increase sequential accesses. For example, the address processing unit 441 may select candidate physical addresses that are sequential to or close with each other (e.g., from a same row or column within a bank). The physical addresses to be selected from may be obtained from a plurality of node identifiers adjacent to the root node identifier in the graph. As a result, the address processing unit 441 may provide candidate physical addresses storing data for the candidate node identifiers, and the data for the candidate node identifiers are stored in a sequential manner. In some embodiments, some of the candidate physical addresses selected by the address processing unit 441 may be sequential to the received physical address corresponding to a root node. In some embodiments, the sequential addresses may be determined using a fixed size of nodes in the memory 430. For example, a node may have a fixed size of 128 bytes when the node is stored in the memory 430. As a result, from the received physical address, the address processing unit 441 may select candidate physical addresses in increments of 128 bytes, hence increasing or maximizing the sequential accesses. In some embodiments, the candidate physical addresses may include identifiers on the bank and the row or column of the candidate physical addresses.

In some embodiments, to increase sequential access, the address processor 425 may be configured to generate the candidate physical addresses based on the size of the data retrieved from the memory (e.g., the memory 430) in one read operation. For example, a single read operation on the memory 430 may retrieve 1024 bytes of data. Assuming that information of a node (e.g., attribute data of the node) takes 128 bytes of memory, a single read operation may retrieve data for 8 nodes. Since the data for all of the 8 nodes may be retrieved all together, each node of the 8 nodes may become a candidate node, and their information may be made available without additional read operations on the memory. As a result, the addresses of the candidate nodes may be determined by the address processing unit 441 as candidate physical addresses. If a plurality of these candidate nodes are later selected to join a group of sampled nodes for GNN processing, attributes of these plurality of candidate nodes may only take one read operation to retrieve from the memory, hence the efficiency of memory access is improved.

The address de-mapper 442 may be configured to receive the candidate physical addresses from the address processing unit 441. In some embodiments, the candidate physical addresses may include identifiers of the bank and the row or column of the candidate physical addresses. The address de-mapper 442 may be configured to generate candidate node identifiers according to the received candidate physical addresses. For example, the address de-mapper 442 may use a table to translate a candidate physical address into a candidate node identifier, where the information of the candidate node identifier (e.g., attribute data of the node corresponding to the candidate node identifier) is stored in the candidate physical address. The address de-mapper 442 may be configured to send the candidate node identifiers for GNN sampling (e.g., GNN sampler 322 of FIG. 3).

In some embodiments, to reduce bank conflicts, the address processing unit 441 may be configured to generate bank counters. Each bank counter may refer to a variable corresponding to a bank and indicate a number of candidate nodes are sampled from that bank. In some embodiments, each of the candidate physical addresses has a bank identifier that indicates which bank the candidate physical address is stored in. Using the bank identifier, the address processing unit 441 may increment the bank counter that corresponds to the bank identified by the bank identifier. In some embodiments, the address de-mapper 442 may be configured to receive the bank counters from the address processing unit 441 and send the bank counters for GNN sampling (e.g., GNN sampler 322 of FIG. 3). In some embodiments, the bank counters may be sent directly for GNN sampling from the address processing unit 441. For example, it may not be necessary for the address de-mapper 442 to receive the bank counters for the bank counters to reach GNN sampling.

Figure 5:
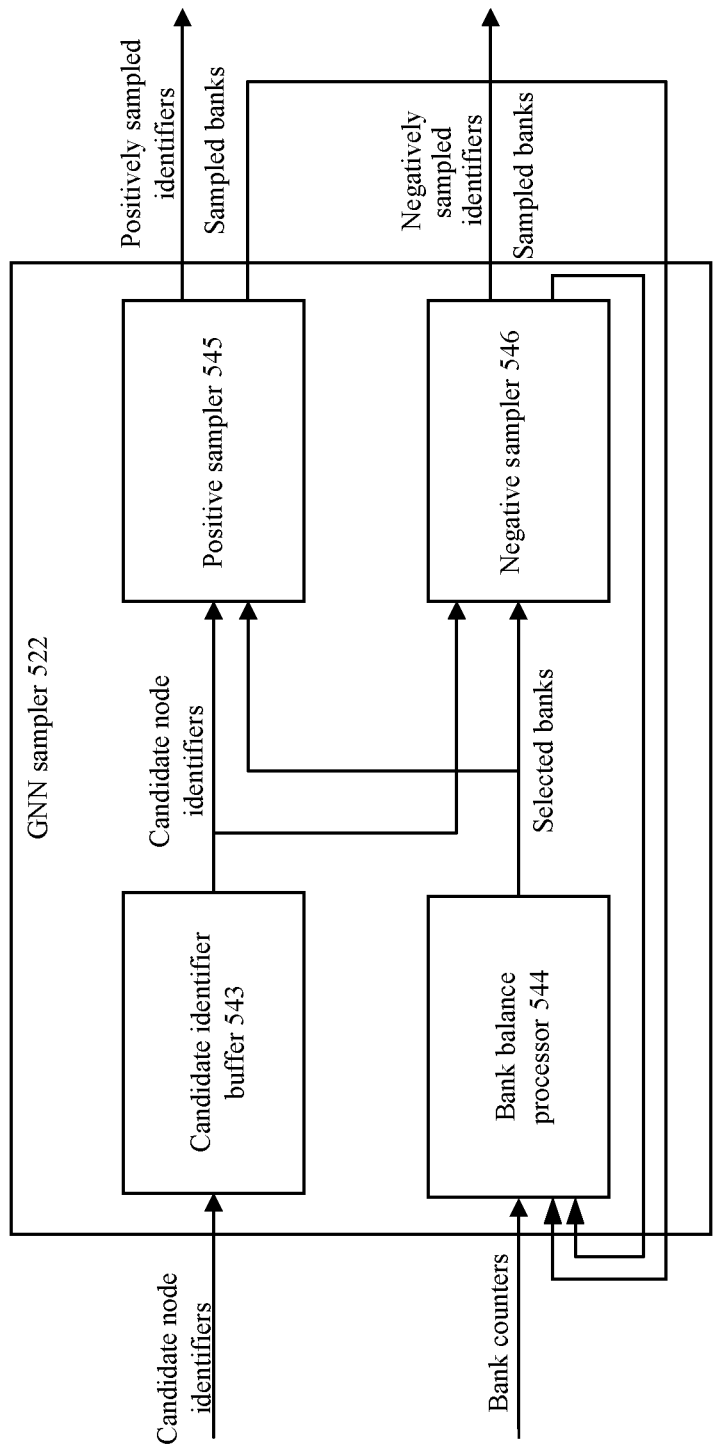
FIG. 5 is a schematic of an example GNN sampler, according to some embodiments of this specification.

FIG. 5 is a schematic of an example GNN sampler, according to some embodiments of this specification. As shown in FIG. 5, a GNN sampler 522 may be similar to the GNN sampler 322 shown in FIG. 3. In some embodiments, the GNN sampler 522 may include a positive sampler 545 and/or a negative sampler 546. In some embodiments, the GNN sampler 522 may include a candidate identifier buffer 543 or a bank balance processor 544. It is appreciated that FIG. 5 merely illustrates the hardware components related to the sampling in GNN processing, and depending on the implementation, the GNN sampler 522 may include more, fewer, or alternative components for implementing other proper functionalities.

In some embodiments, the candidate identifier buffer 543 may be configured to receive candidate node identifiers (e.g., from the address processor 325 of FIG. 3, the address processor 425 of FIG. 4, or the address de-mapper 442 of FIG. 4). The candidate identifier buffer 543 may be configured to store the received candidate node identifiers and send the candidate node identifiers to the positive sampler 545 or the negative sampler 546.

In some embodiments, the bank balance processor 544 may be configured to receive bank counters (e.g., the address processor 325 of FIG. 3, the address processor 425 of FIG. 4, the address de-mapper 442 of FIG. 4, or the address processing unit 441 of FIG. 4). The bank balance processor 544 may be configured to update the values of the bank counters and keep track of the banks from which the GNN sampling is enabled according to the bank counters. The banks that are enabled for sampling may be referred to as "selected banks." In some embodiments, the value of a bank counter may be updated when a candidate node from the corresponding bank is sampled (either by the positive sampler 545 or the negative sampler 546). For example, after the positive sampler 545 samples a candidate node from an enabled bank, the bank counter of the enabled bank may be increased by one to reflect the number of sampled nodes it provides. The goal is to keep the bank counters of the banks as close or balanced as possible. If one bank provides significantly more candidate nodes than others, it may be disabled for a period of time for other banks to catch up. Accordingly, when a bank is removed from the selected banks (e.g., being marked as disabled via an invalid flag), the positive sampler 545 and the negative sampler 546 may not sample nodes from that bank. In some embodiments, one bank may be marked as disabled when a difference between its bank counter (indicating the number of nodes sampled therein) and a minimum value of all bank counters is greater than a threshold value. For example, the process may include determining, for a plurality of banks that includes the one bank, a plurality of counter registers storing the bank counters; determining a minimum value from the plurality of counter registers; and determining whether a difference between the number of sampled node identifiers and the minimum value exceeds the selection threshold of the bank. This way, excessive access on a single bank may be reduced or avoided.

In some embodiments, the bank counters can indicate a number of read operations on each bank. For example, if the positive sampler 545 samples a candidate node from an enabled bank, but the candidate node does not cause extra read operations on the memory (e.g., attribute data of the newly selected candidate node can be retrieved together with attribute data of other selected candidate nodes in one read operation), the bank counter of the enabled bank may not be increased, since no extra read operations are needed. The goal is to keep the bank counters of the banks as close or balanced as possible. If one bank provides significantly more candidate nodes than others, it may be disabled for a period of time for other banks to catch up.

In some embodiments, the positive sampler 545 is configured to receive candidate node identifiers and selected banks (e.g., from the candidate identifier buffer 543 or the bank balance processor 544). The positive sampler 545 may be configured to select, from the candidate node identifiers, one or more positively sampled node identifiers according to the selected banks. The one or more positively sampled node identifiers may be adjacent to or connected with the root node identifier received by the address processor (e.g., the address processor 425 of FIG. 4 or the address processor 325 of FIG. 3). In some embodiments, the positively sampled node identifiers may be within a "preset distance" from the root node. In some embodiments, the one or more positively sampled node identifiers belong to the selected banks, and some of the candidate node identifiers that do not belong to the selected banks may not be selected by the positive sampler 545.

In some embodiments, the negative sampler 546 is configured to receive candidate node identifiers and selected banks (e.g., from the candidate identifier buffer 543 or the bank balance processor 544). The negative sampler 545 may be configured to select, from the candidate node identifiers, one or more negatively sampled node identifiers according to the selected banks. The one or more negatively sampled node identifiers are not adjacent to the root node identifier received by the address processor (e.g., the address processor 425 of FIG. 4 or the address processor 325 of FIG. 3). In some embodiments, the negatively sampled node identifiers may be outside of a "preset distance" from the root node. In some embodiments, the one or more negatively sampled node identifiers belong to the selected banks, and some of the candidate node identifiers that do not belong to the selected banks may not be selected by the negative sampler 545.

In some embodiments, having selected the positively sampled node identifiers, the positive sampler 545 may be configured to determine a number of positively sampled node identifiers in each bank. For example, if the positive sampler 545 selects 3 positively sampled node identifiers from bank 1 and 6 positively sampled node identifiers from bank 2, the positive sampler 545 may determine that the number of positively sampled node identifiers in bank 1 is 3, and the number of positively sampled node identifiers in bank 2 is 6. The positive sampler 545 may be configured to collect the number of positively sampled node identifiers in all banks and send the collected numbers to the bank balance processor 544.

In some embodiments, having selected the negatively sampled node identifiers, the negative sampler 546 may be configured to determine a number of negatively sampled node identifiers in each bank. For example, if the negative sampler 546 selects 2 negatively sampled node identifiers from bank 1 and 18 negatively sampled node identifiers from bank 2, the negative sampler 546 may determine that the number of negatively sampled node identifiers in bank 1 is 2, and the number of negatively sampled node identifiers in bank 2 is 18. The negative sampler 546 may be configured to collect the number of negatively sampled node identifiers in all banks and send the collected numbers to the bank balance processor 544.

In some embodiments, the bank balance processor 544 may be further configured to receive the number of positively sampled node identifiers and the number of negatively sampled node identifiers in each bank (e.g., from the positive sampler 545 and the negative sample 546). The bank balance processor 544 may be configured to generate or update the selected banks according to the received bank counters, the number of positively sampled node identifiers, and the number of negatively sampled node identifiers in each bank. In some embodiments, the selected banks are generated or selected according to the received bank counters and the number of positively sampled node identifiers and the number of negatively sampled node identifiers in each bank to reduce or minimize bank conflicts.

One way to reduce or minimize bank conflicts is to use a selection threshold for each bank. A selection threshold may be a maximum number of accesses in each bank. If the number of positively sampled node identifiers and the number of negatively sampled node identifiers of a bank add up to exceed the selection threshold for the bank, the bank may not be selected by the bank balance processor 544 to become a selected bank. As a result, the positive sampler 545 and the negative sampler 546 may not select positively sampled node identifiers and the negatively sampled node identifiers that belong to this bank. For example, for bank 1, the number of positively sampled node identifiers is 3 and the number of negatively sampled node identifiers is 2. The total number of sampled node identifiers for bank 1 is 5. If a selection threshold for bank 1 is 6, bank 1 may still be selected by bank balance processor 544 to be one of the selected banks. As a result, the positive sampler 545 and the negative sampler 546 may still be able to select positively sampled node identifiers and negatively sampled node identifiers that belong to bank 1. In another example, for bank 2, the number of positively sampled node identifiers is 6 and the number of negatively sampled node identifiers is 18. The total number of sampled node identifiers (which includes the positively sampled node identifiers and the negatively sampled node identifiers) for bank 2 is 24. If a selection threshold for bank 2 is 6, bank 2 may no longer be selected by bank balance processor 544 to be one of the selected banks. As a result, the positive sampler 545 and the negative sampler 546 may not be able to select positively sampled node identifiers and the negatively sampled node identifiers that belong to bank 2. In some embodiments, the selection threshold for each bank may be different from each other. In some embodiments, the selection threshold may be determined according to a minimum number of sampled node identifiers in a bank.

In some embodiments, the bank balance processor 544 is configured to update the selected banks when the number of sampled node identifiers in any of the banks changes. For example, if the positive sampler 545 selects one positively sampled node identifier from bank 1, the positive sampler 545 may send this selection on bank 1 to the bank balance processor 544. The bank balance processor 544 may be configured to update a counter that keeps track of the number of sampled node identifiers for bank 1 and check the counter against the selection threshold of bank 1. If the counter exceeds the selection threshold of bank 1, the bank balance processor 544 may remove bank 1 from the selected banks, so that the positive sampler 545 may not select a positively sampled node identifier from bank 1 for its next sample selection.

Figure 6:
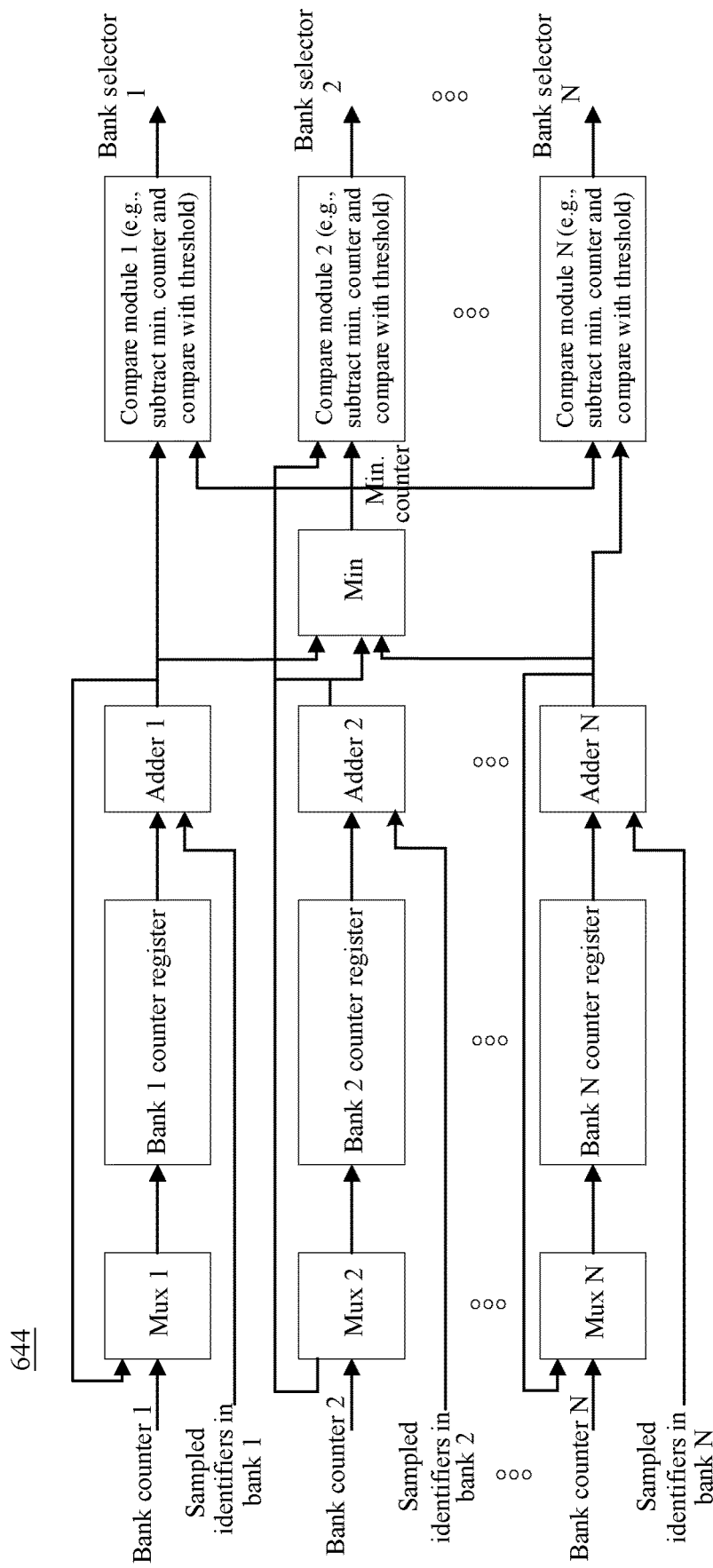
FIG. 6 is a schematic of an example bank balance processor, according to some embodiments of this specification.

FIG. 6 is a schematic of an example bank balance processor, according to some embodiments of this specification. As shown in FIG. 6, a bank balance processor 644 may be similar to the bank balance processor 544 shown in FIG. 5. In some embodiments, the bank balance processor 644 may keep track of the number of sampled node identifiers in each of the N banks, namely bank 1 to bank N. It is appreciated that FIG. 6 merely illustrates the hardware components related to using bank counters for GNN processing, and depending on the implementation, the bank balance processor 644 may include more, fewer, or alternative components for implementing other proper functionalities.

As shown in FIG. 6, the bank balance processor 644 may include a plurality of bank counter registers. Each of the plurality of bank counter registers may keep track of the number of sampled node identifiers in each bank. For example, as shown in FIG. 6, a bank 1 counter register may keep track of the number of sampled node identifiers in bank 1. When one or more node identifiers are sampled from bank 1 (e.g., by the positive sampler 545 or the negative sampler 546), the number of sampled node identifiers may be added with the number stored in the bank 1 counter register using adder 1.

In some embodiments, as shown in FIG. 6, the numbers of sampled node identifiers in all banks may be compared to determine a minimum number using the "min" module. The result of the comparison may be sent out of the min module as minimum counter to a number of compare modules, with each of the compare modules corresponding to a bank. For example, the numbers of sampled node identifiers for bank 1 through N range between 8 and 34. As a result, the minimum counter may be determined by the min module as 8.

In some embodiments, each of the compare modules may be configured to determine if a corresponding bank may be a selected bank (e.g., a bank that is enabled for sampling). The determination result may be output from the compare module as a bank selector. In some embodiments, the determination result may be based on a selection threshold (e.g., similar to the selection threshold used in GNN sampler 522 of FIG. 5). In some embodiments, the determination result may be based on the minimum counter and a selection threshold. Using bank 1 as an example, if the minimum counter is 8, and the number of sampled node identifiers in bank 1 is 15, the compare module 1 may determine a difference between the minimum counter and the number of sampled node identifiers to be 7. If the selection threshold is 10, compare module 1 may determine that bank 1 may be selected for sampling, since the determined difference is smaller than the selection threshold. If the difference between the minimum counter and the number of sampled node identifiers is determined to be larger or equal to the threshold, the corresponding bank may not be selected for sampling.

In some embodiments, systems, modules, and subunits described in FIG. 3, FIG. 4, FIG. 5, and FIG. 6 may be implemented on a field-programmable gate array (FPGA) or an application-specific integrated circuit (ASIC). For example, GNN accelerator 320 of FIG. 3 may be implemented on an FPGA and programmable.

Figure 7:
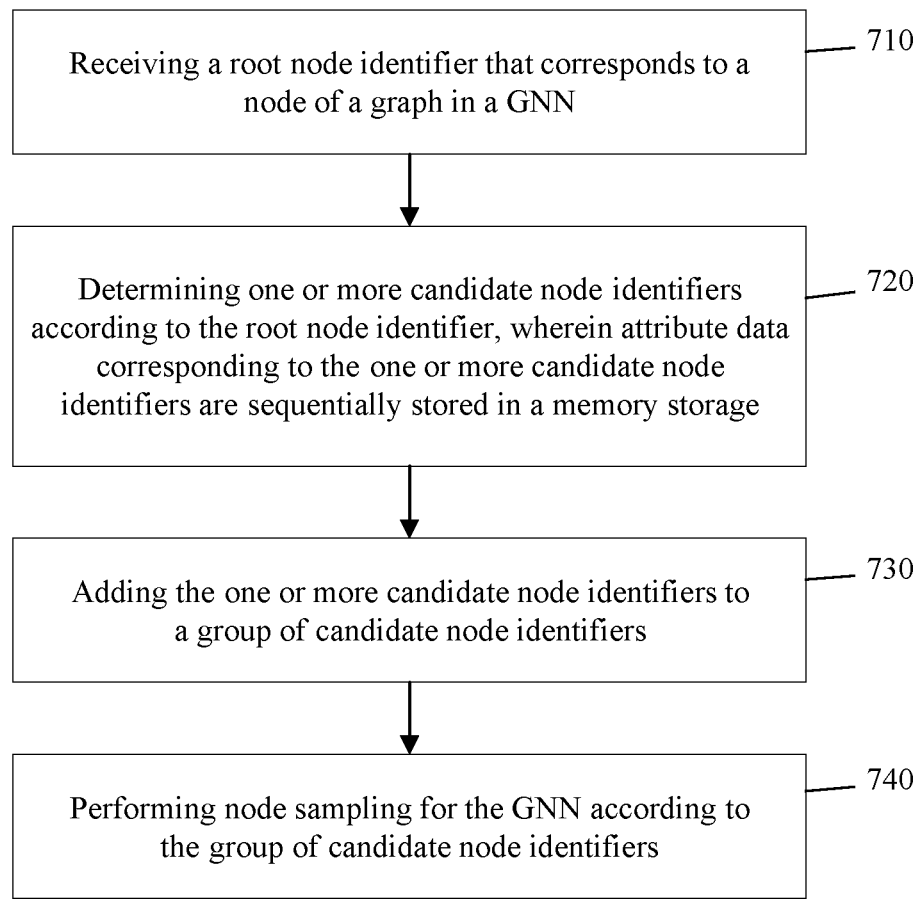
FIG. 7 is a flowchart of an example method for performing GNN-based memory accessing, according to some embodiments of this specification.

Embodiments of this specification further provide methods for improved memory access in GNN processing. FIG. 7 is a flowchart of an example method for performing GNN-based memory accessing, according to some embodiments of this specification. It is appreciated that method 700 shown in FIG. 7 may be performed by a device, apparatus or system illustrated in FIGS. 1-6, such as the GNN accelerator 320 of FIG. 3. Depending on the implementation, the method 700 may include additional, fewer, or alternative steps performed in various orders or parallel.

In step 710, a root node identifier corresponding to a node in a graph for GNN processing is received. In some embodiments, a plurality of root node identifiers may be received. In some embodiments, the root node identifier is received by a graph structure processor (e.g., graph structure processor 321) of a GNN processor (e.g., GNN accelerator 320).

In step 720, one or more candidate node identifiers are determined according to the root node identifier. In some embodiments, information corresponding to the one or more candidate node identifiers (e.g., attribute data) are stored sequentially in a memory. In some embodiments, the memory may be a DDR (e.g., similar to the memory 330 of FIG. 3 or the memory 430 of FIG. 4).

In some embodiments, to determine the one or more candidate node identifiers, one or more candidate physical addresses that are sequential to each other are determined. The one or more candidate node identifiers may be determined according to the one or more candidate physical addresses. For example, as shown in FIG. 4, the address processor 441 may generate candidate physical addresses by selecting physical addresses that are sequential to or close with each other. The physical addresses to be selected from may be obtained from a plurality of adjacent node identifiers in the graph according to the root node identifier. Having generated the candidate physical addresses, the address de-mapper 442 may generate candidate node identifiers according to the candidate physical addresses received from the address processor 441. In some embodiments, some of the candidate physical addresses selected by the address processor 441 may be sequential to the received physical address corresponding to the root node. In some embodiments, the candidate physical addresses may include identifiers on the bank and the row or column of the candidate physical addresses.

In some embodiments, to increase sequential access, the candidate physical addresses may be generated based on the size of the data retrieved from the memory (e.g., the memory 430 in FIG. 4) in one read operation. For example, as shown in FIG. 4, a single read operation on the memory 430 may retrieve 1024 bytes of data. Assuming that information of a node (e.g., attribute data of the node) takes 128 bytes of memory, a single read operation may retrieve data for 8 nodes. Since the data for all of the 8 nodes may be retrieved all together, each of the 8 nodes may become a candidate node, and their information may be made available without additional read operations on the memory. As a result, the addresses of the candidate nodes may be determined by the address processor 441 as candidate physical addresses. If a plurality of these candidate nodes are later selected to join a group of sampled nodes for GNN processing, attributes of these plurality of candidate nodes may only take one read operation to retrieve from the memory, hence the efficiency of memory access can be improved.

Referring back to FIG. 7, in step 730, the one or more candidate node identifiers are added into a group of candidate node identifiers. The group of candidate node identifiers may be used for sampling in GNN processing. For example, as shown in FIG. 3, the GNN accelerator 320 may receive a plurality of root node identifiers. For each of the plurality of root node identifiers, the address processor 325 may generate one or more candidate node identifiers, and each set of the one or more candidate node identifiers may be added into the group of candidate node identifiers for the GNN sampler 322. In some embodiments, the group of candidate node identifiers may include other node identifiers that were not generated or determined in step 720.

In step 740, one or more graph node identifiers are sampled from the group of candidate node identifiers for the GNN processing. The one or more graph node identifiers may be used by, for example, dedicated processors (e.g., dedicated processors 240 of FIG. 2) to perform GNN training or GNN processing. Once the one or more graph node identifiers are sampled, attribute data corresponding to the one or more graph node identifiers may be retrieved from the memory. For example, as shown in FIG. 3, the GNN attribute processor 323 may receive sampled node identifiers from the GNN sampler 322 and fetch from the memory 230 information of the sampled nodes, including one or more features or attributes of each of the sampled nodes.

In some embodiments, the group of candidate node identifiers may be positively sampled. For example, as shown in FIG. 5, the positive sampler 545 may receive the group of candidate node identifiers and perform positive sampling on the group of candidate node identifiers to generate one or more positively sampled node identifiers. Based on the positive sampling, one or more positively sampled nodes corresponding to the one or more positively sampled node identifiers may have a connection via edges with the one or more root nodes corresponding to the one or more root node identifiers. For example, the one or more positively sampled nodes may be adjacent to the one or more root nodes. In some embodiments, the positively sampled node identifiers may be within a preset distance from the one or more root nodes.

In some embodiments, the group of candidate node identifiers may be negatively sampled. For example, as shown in FIG. 5, the negative sampler 546 may receive the group of candidate node identifiers and perform negative sampling on the group of candidate node identifiers to generate one or more negatively sampled node identifiers. Based on the negative sampling, one or more negatively sampled nodes corresponding to the one or more negatively sampled node identifiers may not have a direct connection via edges with the one or more root nodes corresponding to the one or more root node identifiers. For example, the one or more negatively sampled nodes may not be adjacent or close to the one or more root nodes. In some embodiments, the negatively sampled node identifiers may be outside a preset distance from the one or more root nodes.

Figure 8:
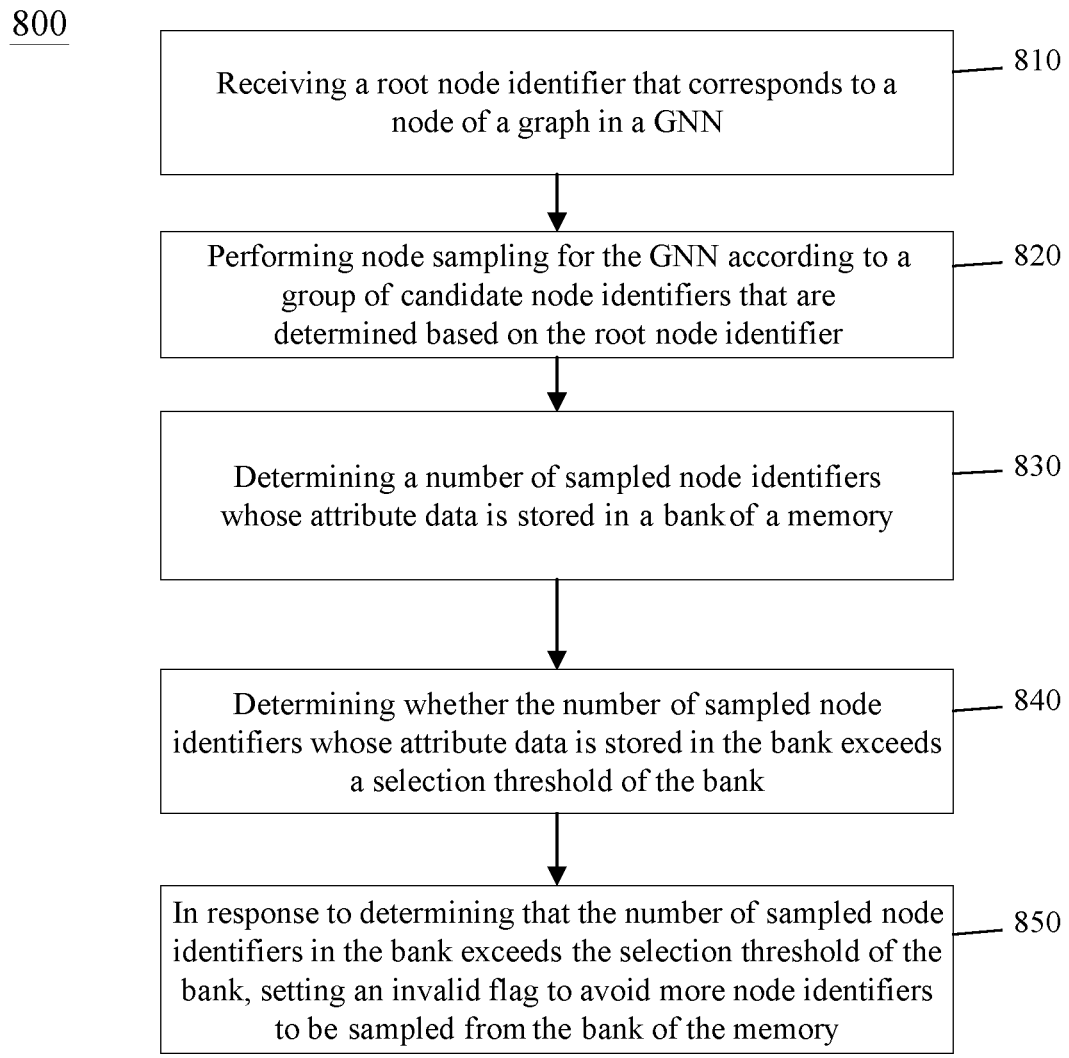
FIG. 8 is a flowchart of an example method for performing GNN-based memory accessing using bank counters, according to some embodiments of this specification.

FIG. 8 is a flowchart of an example method for performing GNN-based memory accessing using bank counters, according to some embodiments of this specification. It is appreciated that method 800 shown in FIG. 8 may be performed by a device, apparatus or system illustrated in FIGS. 1-6, such as the GNN accelerator 320 of FIG. 3. In some embodiments, the method 800 shown in FIG. 8 may be performed together with the method 700 shown in FIG. 7. Depending on the implementation, the method 700 may include additional, fewer, or alternative steps performed in various orders or parallel.

In step 810, a root node identifier corresponding to a node in a graph for GNN processing is received. In some embodiments, similar to step 710 of FIG. 7, a plurality of root node identifiers may be received. In some embodiments, the root node identifier is received by a graph structure processor (e.g., graph structure processor 321) of a GNN processor (e.g., GNN accelerator 320).

In step 820, node sampling may be performed for the GNN according to a group of candidate node identifiers that are determined based on the root node identifier. In some embodiments, the group of candidate node identifiers may be sampled according to step 740 shown in FIG. 7. For example, the group of identifiers may be sampled by performing positive sampling or negative sampling. In some embodiments, at least some of the group of candidate node identifiers may be determined according to the root node identifier. For example, as shown in step 720 of FIG. 7, one or more candidate node identifiers may be determined wherein the attribute data corresponding to the one or more candidate node identifiers are sequentially stored in the memory.

In step 830, a number of sampled node identifiers whose attribute data is stored in a bank of the memory is determined. For example, as shown in FIG. 5, the positive sampler 545 and the negative sampler 546 may determine a number of positively sampled node identifiers and a number of negatively sampled node identifiers in each bank. The bank balance processor 544 may receive the number of positively sampled node identifiers and the number of negatively sampled node identifiers in each bank, and generate a number of sampled node identifiers for each bank.

In some embodiments, in step 830, a number of read operations on each bank is determined. For example, as shown in FIG. 5, if the positive sampler 545 samples a candidate node from an enabled bank, but the candidate node does not cause extra read operations on the memory (e.g., attribute data of the newly selected candidate node can be retrieved together with attribute data of other selected candidate nodes in one read operation), the bank counter of the enabled bank may not be increased, since no extra read operations are needed. The goal is to keep the bank counters of the banks as close or balanced as possible. If one bank provides significantly more candidate nodes than others, it may be disabled for a period of time for other banks to catch up.

In some embodiments, a counter may be kept to keep track of the number of sampled node identifiers in each bank. For example, as shown in FIG. 6, the bank 1 counter register may keep track of the number of sampled node identifiers in bank 1. When one or more node identifiers are sampled from bank 1, the number of sampled node identifiers may be added to the number stored in the bank 1 counter register using adder 1. In some embodiments, the counter can track the number of read operations on each bank.

In step 840, it is determined whether the number of sampled node identifiers whose attribute data is stored in the bank exceeds a selection threshold of the bank. For example, as shown in FIG. 5, a selection threshold may be a maximum number of accesses in each bank, and the number of positively sampled node identifiers and the number of negatively sampled node identifiers of a bank may be added up to determine of the sum exceeds the selection threshold for the bank. In another example, as shown in FIG. 6, a minimum counter may be generated according to the numbers of sampled node identifiers in all banks. The determination result may be based on the minimum counter and the selection threshold. For example, If the difference between the minimum counter and the number of sampled node identifiers is determined to be larger or equal to the selection threshold, the corresponding bank may not be selected for sampling. It is appreciated that different banks may have different selection thresholds. In some embodiments, the number of read operations on a bank is compared with the selection threshold of the bank.

In step 850, in response to determining that the number of sampled node identifiers in the bank exceeds the selection threshold of the bank, an invalid flag is set to avoid more node identifiers to be sampled from the bank of the memory. For example, as shown in FIG. 5, if the number of positively sampled node identifiers and the number of negatively sampled node identifiers of a bank add up to exceed the selection threshold for the bank, the bank may not be selected by the bank balance processor 544 to become a selected bank. As a result, the positive sampler 545 and the negative sampler 546 may not select positively sampled node identifiers and the negatively sampled node identifiers that belong to this bank. In another example, as shown in FIG. 6, if the difference between the minimum counter and the number of sampled node identifiers is determined to be larger or equal to the threshold, the corresponding bank may not be selected for sampling. In some embodiments, the invalid flag is set in response to the number of read operations on a bank exceeding the selection threshold of the bank.

Embodiments of this specification provide systems and methods that improve memory access for GNN sampling. According to the systems and methods, candidate node identifiers may be determined with a goal to increase sequential accesses on a memory (e.g., a DDR) for the GNN sampling. For many types of the memory that allows a single read operation to extract a plurality of attribute data, having candidate node identifiers that are sequential to each other allows the attribute data corresponding to the candidate node identifiers to be extracted from the memory in a single read operation, hence improving the overall efficiency of the memory access in the GNN sampling. Moreover, bank counters may be used to keep track of the number of data to be accessed in each bank of the memory. With the assistance of the bank counters, the GNN sampling may be balanced to reduce or minimize bank conflicts on the memory, hence further improving the efficiency in memory access.

Figure 9:
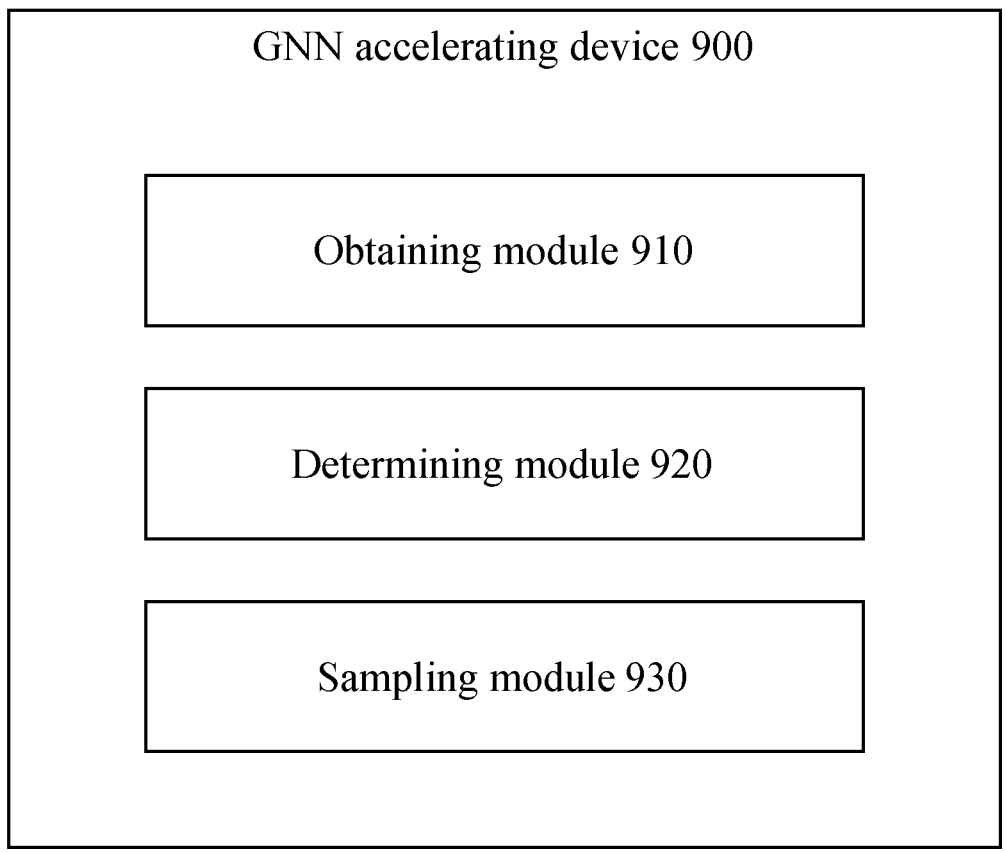
FIG. 9 is a block diagram of an example GNN accelerating device with improved memory access, according to some embodiments of this specification.

FIG. 9 is a block diagram of an example GNN accelerating device with improved memory access, according to some embodiments of this specification. As shown in FIG. 9, the GNN accelerating device 900 can comprise an obtaining module 910, a determining module 920, and a sampling module 930. Depending on the implementation, the GNN accelerating device 900 may include additional, fewer, or alternative components.

In some embodiments, the obtaining module 910 may be configured to obtain a root node identifier corresponding to a node in a graph for GNN processing. In some embodiments, the obtaining module may be configured to obtain a plurality of root node identifiers. In some embodiments, the obtaining module 910 is configured to obtain the root node identifier via a graph structure processor (e.g., graph structure processor 321) of a GNN processor (e.g., GNN accelerator 320).

In some embodiments, the determining module 920 is configured to receive the obtained root node identifier from the obtaining module 910 and determine one or more candidate node identifiers according to the root node identifier. In some embodiments, information corresponding to the one or more candidate node identifiers (e.g., attribute data) are stored sequentially in a memory. In some embodiments, the memory may be a DDR (e.g., similar to the memory 330 of FIG. 3 or the memory 430 of FIG. 4).

In some embodiments, to determine the one or more candidate node identifiers, the determining module is further configured to determine one or more candidate physical addresses that are sequential to each other. The one or more candidate node identifiers may be determined according to the one or more candidate physical addresses. For example, as shown in FIG. 4, the address processor 441 may generate candidate physical addresses by selecting physical addresses that are sequential to or close with each other. The physical addresses to be selected from may be obtained from a plurality of adjacent node identifiers in the graph according to the root node identifier. Having generated the candidate physical addresses, the address de-mapper 442 may generate candidate node identifiers according to the candidate physical addresses received from the address processor 441. In some embodiments, some of the candidate physical addresses selected by the address processor 441 may be sequential to the received physical address corresponding to the root node. In some embodiments, the candidate physical addresses may include identifiers on the bank and the row or column of the candidate physical addresses.

In some embodiments, to increase sequential access, the determining module is further configured to generate the candidate physical addresses based on the size of the data retrieved from the memory (e.g., the memory 430 in FIG. 4) in one read operation. For example, as shown in FIG. 4, a single read operation on the memory 430 may retrieve 1024 bytes of data. Assuming that information of a node (e.g., attribute data of the node) takes 128 bytes of memory, a single read operation may retrieve data for 8 nodes. Since the data for all of the 8 nodes may be retrieved all together, each of the 8 nodes may become a candidate node, and their information may be made available without additional read operations on the memory. As a result, the addresses of the candidate nodes may be determined by the address processor 441 as candidate physical addresses. If a plurality of these candidate nodes are later selected to join a group of sampled nodes for GNN processing, attributes of these plurality of candidate nodes may only take one read operation to retrieve from the memory, hence the efficiency of memory access can be improved.

In some embodiments, the sampling module 930 is configured to receive the one or more candidate node identifiers and sample one or more graph node identifiers at least from the one or more candidate node identifiers for the GNN processing. The one or more graph node identifiers may be used by, for example, dedicated processors (e.g., dedicated processors 240 of FIG. 2) to perform GNN training or GNN processing. Once the one or more graph node identifiers are sampled, attribute data corresponding to the one or more graph node identifiers may be retrieved from the memory. For example, as shown in FIG. 3, the GNN attribute processor 323 may receive sampled node identifiers from the GNN sampler 322 and fetch from the memory 230 information of the sampled nodes, including one or more features or attributes of each of the sampled nodes.

In some embodiments, the sampling module 930 may comprise a positive sampling module configured to perform positive sampling on the one or more candidate node identifiers. For example, as shown in FIG. 5, the positive sampler 545 may receive the group of candidate node identifiers and perform positive sampling on the group of candidate node identifiers to generate one or more positively sampled node identifiers. Based on the positive sampling, one or more positively sampled nodes corresponding to the one or more positively sampled node identifiers may have a connection via edges with the one or more root nodes corresponding to the one or more root node identifiers. For example, the one or more positively sampled nodes may be adjacent to the one or more root nodes. In some embodiments, the positively sampled node identifiers may be within a preset distance from the one or more root nodes.

In some embodiments, the sampling module 930 may comprise a negative sampling module configured to perform negative sampling on the one or more candidate node identifiers. For example, as shown in FIG. 5, the negative sampler 546 may receive the group of candidate node identifiers and perform negative sampling on the group of candidate node identifiers to generate one or more negatively sampled node identifiers. Based on the negative sampling, one or more negatively sampled nodes corresponding to the one or more negatively sampled node identifiers may not have a direct connection via edges with the one or more root nodes corresponding to the one or more root node identifiers. For example, the one or more negatively sampled nodes may not be adjacent or close to the one or more root nodes. In some embodiments, the negatively sampled node identifiers may be outside a preset distance from the one or more root nodes.

Figure 10:
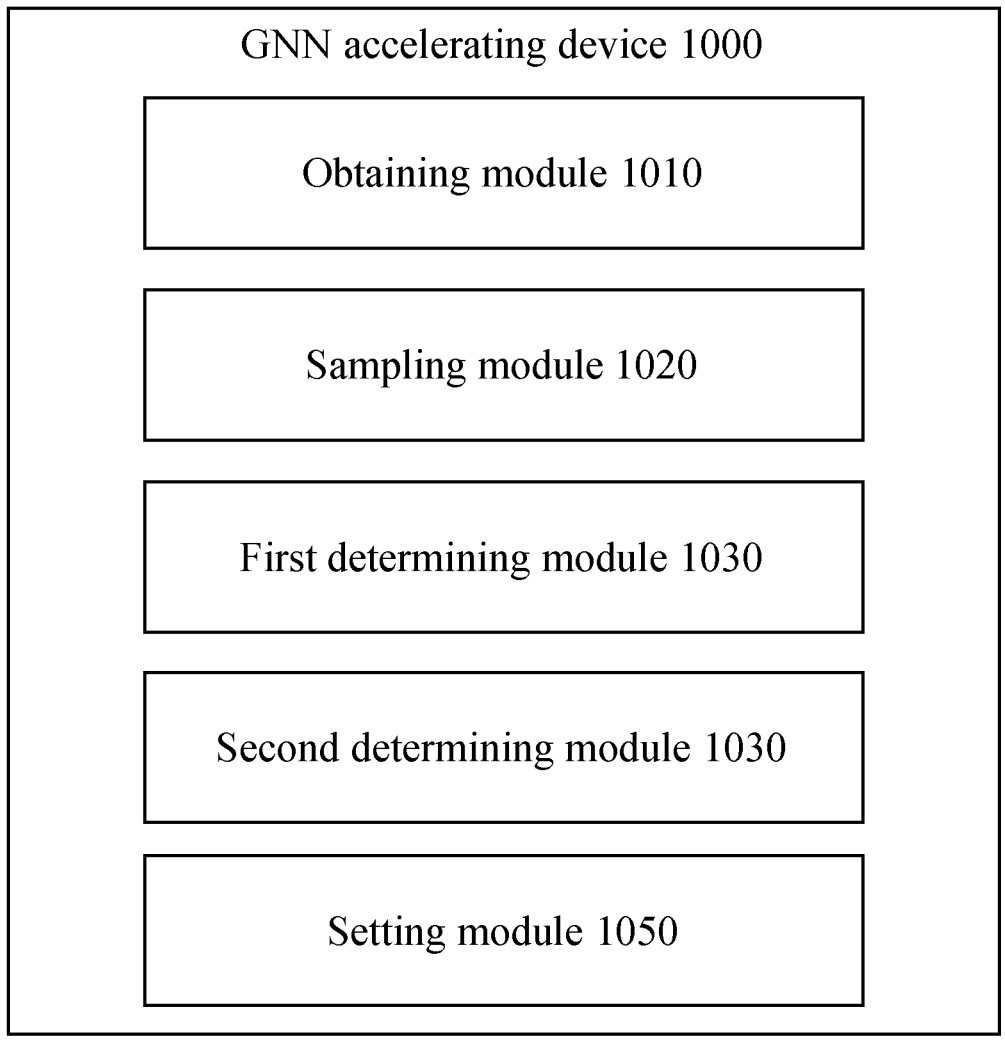
FIG. 10 is a block diagram of an example GNN accelerating device with improved memory access using bank counters, according to some embodiments of this specification.

FIG. 10 is a block diagram of an example GNN accelerating device with improved memory access using bank counters, according to some embodiments of this specification. As shown in FIG. 10, the GNN accelerating device 1000 can comprise an obtaining module 1010, a sampling module 1020, and a first determining module 1030, a second determining module 1040, and a setting module 1050. In some embodiments, the GNN accelerating device 1000 can be implemented together with the GNN accelerating device 900 shown in FIG. 9. Depending on the implementation, the GNN accelerating device 1000 may include additional, fewer, or alternative components.

In some embodiments, similar to the obtaining module 910 shown in FIG. 9, the obtaining module 1010 is configured to obtain a root node identifier corresponding to a node in a graph for GNN processing. In some embodiments, the obtaining module may be configured to obtain a plurality of root node identifiers. In some embodiments, the obtaining module 1010 is configured to obtain the root node identifier via a graph structure processor (e.g., graph structure processor 321) of a GNN processor (e.g., GNN accelerator 320).

In some embodiments, the sampling module 1020 is configured to perform node sampling for the GNN according to a group of candidate node identifiers that are determined based on the root node identifier. In some embodiments, the group of candidate node identifiers may be sampled according to step 740 shown in FIG. 7. For example, the group of identifiers may be sampled by performing positive sampling or negative sampling. In some embodiments, at least some of the group of candidate node identifiers may be determined according to the root node identifier. For example, as shown in step 720 of FIG. 7, one or more candidate node identifiers may be determined wherein the attribute data corresponding to the one or more candidate node identifiers are sequentially stored in the memory.

In some embodiments, the first determining module 1030 is configured to determine a number of sampled node identifiers whose attribute data is stored in a bank of the memory. For example, as shown in FIG. 5, the positive sampler 545 and the negative sampler 546 may determine a number of positively sampled node identifiers and a number of negatively sampled node identifiers in each bank. The bank balance processor 544 may receive the number of positively sampled node identifiers and the number of negatively sampled node identifiers in each bank, and generate a number of sampled node identifiers for each bank.

In some embodiments, the first determining module is configured to determine a number of read operations on each bank. For example, as shown in FIG. 5, if the positive sampler 545 samples a candidate node from an enabled bank, but the candidate node does not cause extra read operations on the memory (e.g., attribute data of the newly selected candidate node can be retrieved together with attribute data of other selected candidate nodes in one read operation), the bank counter of the enabled bank may not be increased, since no extra read operations are needed. The goal is to keep the bank counters of the banks as close or balanced as possible. If one bank provides significantly more candidate nodes than others, it may be disabled for a period of time for other banks to catch up.

In some embodiments, a counter may be kept to keep track of the number of sampled node identifiers in each bank. For example, as shown in FIG. 6, the bank 1 counter register may keep track of the number of sampled node identifiers in bank 1. When one or more node identifiers are sampled from bank 1, the number of sampled node identifiers may be added to the number stored in the bank 1 counter register using adder 1. In some embodiments, the counter can track the number of read operations on each bank.

In some embodiments, the second determining module 1040 is configured to determine whether the number of sampled node identifiers whose attribute data is stored in the bank exceeds a selection threshold of the bank. For example, as shown in FIG. 5, a selection threshold may be a maximum number of accesses in each bank, and the number of positively sampled node identifiers and the number of negatively sampled node identifiers of a bank may be added up to determine of the sum exceeds the selection threshold for the bank. In another example, as shown in FIG. 6, a minimum counter may be generated according to the numbers of sampled node identifiers in all banks. The determination result may be based on the minimum counter and the selection threshold. For example, If the difference between the minimum counter and the number of sampled node identifiers is determined to be larger or equal to the selection threshold, the corresponding bank may not be selected for sampling. It is appreciated that different banks may have different selection thresholds. In some embodiments, the number of read operations on a bank is compared with the selection threshold of the bank.

In some embodiments, the setting module 1050 is configured to, in response to a determination that the number of sampled node identifiers in the bank exceeds the selection threshold of the bank, setting an invalid flag to avoid more node identifiers to be sampled from the bank of the memory. For example, as shown in FIG. 5, if the number of positively sampled node identifiers and the number of negatively sampled node identifiers of a bank add up to exceed the selection threshold for the bank, the bank may not be selected by the bank balance processor 544 to become a selected bank. As a result, the positive sampler 545 and the negative sampler 546 may not select positively sampled node identifiers and the negatively sampled node identifiers that belong to this bank. In another example, as shown in FIG. 6, if the difference between the minimum counter and the number of sampled node identifiers is determined to be larger or equal to the threshold, the corresponding bank may not be selected for sampling. In some embodiments, the invalid flag is set in response to the number of read operations on a bank exceeding the selection threshold of the bank.

Each process, methods, and algorithms described in the preceding sections may be embodied in, and fully or partially automated by, code modules executed by one or more computer systems or computer processors comprising computer hardware. The processes and algorithms may be implemented partially or wholly in application-specific circuit.

When the functions disclosed herein are implemented in the form of software functional units and sold or used as independent products, they may be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner Blocks or states may be added to or removed from the disclosed example embodiments. The exemplary systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
   receiving a root node identifier corresponding to a root node in a graph for graph neural network (GNN) processing;
   determining a plurality of node identifiers for a plurality of nodes in the graph according to locations of the plurality of nodes in the graph relative to the root node;
   mapping the plurality of node identifiers respectively to physical memory addresses in a memory, wherein:
      each of the physical memory addresses in the memory stores attribute data of the node identified by the corresponding node identifier, and
      each of the physical memory addresses comprises a memory bank identifier of a memory bank, wherein each memory bank stores a plurality of rows, columns, or memory pages;
   selecting, based on the memory bank identifiers of the physical memory addresses, a subset of the physical memory addresses that maximizes intra-memory-bank sequential memory access;
   de-mapping the selected subset of the physical memory addresses into corresponding node identifiers to obtain one or more candidate node identifiers; and
   sampling one or more graph node identifiers at least from the one or more candidate node identifiers for the GNN processing.

2. The method of claim 1, wherein the determining a plurality node identifiers for the a plurality of nodes in the graph according to locations of the plurality of nodes in the graph relative to the root node comprises:
   determining a plurality of adjacent node identifiers in the graph according to the root node identifier;
   obtaining physical addresses of the plurality of adjacent node identifiers in the memory;
   identifying one or more candidate physical addresses according to the physical addresses, wherein the one or more candidate physical addresses are sequential in the memory; and
   determining the one or more candidate node identifiers according to the one or more candidate physical addresses.

3. The method of claim 2, wherein the identifying one or more candidate physical addresses according to the physical addresses comprises:
   identifying the one or more candidate physical addresses from which attribute data corresponding to the one or more candidate physical addresses are retrieved in one read operation on the memory.

4. The method of claim 1, further comprising:
   determining a number of sampled node identifiers whose attribute data is stored in a memory bank;

determining whether the number of sampled node identifiers whose attribute data is stored in the memory bank exceeds a selection threshold of the memory bank; and in response to determining that the number of sampled node identifiers in the memory bank exceeds the selection threshold of the memory bank, setting an invalid flag to avoid more node identifiers to be sampled from the memory bank.

5. The method of claim 4, wherein:

the determining a number of sampled node identifiers whose attribute data is stored in a memory bank comprises:

determining the number of sampled node identifiers whose attribute data is stored in the memory bank by reading a counter register for the memory bank; and the method further comprises:

updating the counter register for the memory bank in response to a node identifier from the memory bank being sampled.

6. The method of claim 5, wherein the determining whether the number of sampled node identifiers whose attribute data is stored in the memory bank exceeds a selection threshold of the memory bank comprises:

determining, for a plurality of memory banks that includes the memory bank, a plurality of counter registers, wherein each of the plurality of counter registers corresponds to one of the plurality of memory banks;

determining a minimum value from the plurality of counter registers; and determining whether a difference between the number of sampled node identifiers and the minimum value exceeds the selection threshold of the memory bank.

7. The method of claim 1, wherein the sampling one or more graph node identifiers comprises:

sampling one or more positive node identifiers that are within a preset distance from the root node; and sampling one or more negative node identifiers that are outside the preset distance from the root node.

8. The method of claim 7, wherein the preset distance is one.

9. The method of claim 1, wherein the memory comprises a Double Data Rate (DDR) Synchronous Dynamic Random Access Memory (SDRAM).

10. A system for accelerating Graph Neural Network (GNN) attribute access, comprising:

a memory configured to store attribute data of graph nodes in a graph; and a GNN accelerator configured to:

receive a root node identifier corresponding to a node in the graph for GNN processing;

determine a plurality of node identifiers for a plurality of nodes in the graph according to locations of the plurality of nodes in the graph relative to the root node;

map the plurality of node identifiers respectively to physical memory addresses in a memory, wherein:

each of the physical memory addresses in the memory stores attribute data of the node identified by the corresponding node identifier, and each of the physical memory addresses comprises a memory bank identifier of a memory bank, wherein each memory bank stores a plurality of rows, columns, or memory pages;

select, based on the memory bank identifiers of the physical memory addresses, a subset of the physical memory addresses that maximizes intra-memory-bank sequential memory access;

de-map the selected subset of the physical memory addresses into corresponding node identifiers to obtain one or more candidate node identifiers; and sample one or more graph node identifiers at least from the one or more candidate node identifiers for the GNN processing.

11. The system of claim 10, wherein the GNN accelerator comprises an address processor configured to:

determine a plurality of adjacent node identifiers in the graph according to the root node identifier;

obtain physical addresses of the plurality of adjacent node identifiers in the memory;

identify one or more candidate physical addresses according to the physical addresses, wherein the one or more candidate physical addresses are sequential in the memory; and determine the plurlaity of candidate node identifiers according to the one or more candidate physical addresses.

12. The system of claim 11, wherein the address processor is further configured to:

determine the one or more candidate physical addresses from which attribute data corresponding to the one or more candidate physical addresses are retrieved in one read operation.

13. The system of claim 10, wherein the GNN accelerator comprises a GNN sampler configured to:

determine a number of sampled node identifiers whose attribute data is stored in a memory bank;

determine whether the number of sampled node identifiers whose attribute data is stored in the memory bank exceeds a selection threshold of the memory bank; and in response to determining that the number of sampled node identifiers in the memory bank exceeds the selection threshold of the memory bank, set an invalid flag to avoid more node identifiers to be sampled from the memory bank.

14. The system of claim 13, wherein the GNN sampler is further configured to:

determine the number of sampled node identifiers whose attribute data is stored in the memory bank by reading a counter register for the memory bank; and update the counter register for the memory bank in response to a node identifier from the memory bank being sampled.

15. The system of claim 14, wherein the GNN sampler is further configured to:

determine, for a plurality of memory banks that includes the memory bank, a plurality of counter registers, wherein each of the plurality of counter registers corresponds to one of the plurality of memory banks;

determine a minimum value from the plurality of counter registers; and determine whether a difference between the number of sampled node identifiers and the minimum value exceeds the selection threshold of the memory bank.

16. The system of claim 13, further comprising:

a positive node sampler configured to sample one or more positive node identifiers that are within a preset distance from the root node; and a negative node sampler configured to sample one or more negative node identifiers that are outside the preset distance from the root node.

17. The system of claim 16, wherein the preset distance is one.

18. The system of claim 10, wherein the memory is a Double Data Rate (DDR) Synchronous Dynamic Random Access Memory (SDRAM).

19. The system of claim 10, wherein the GNN accelerator is implemented on a field-programmable gate array (FPGA) or an application-specific integrated circuit (ASIC).

20. A graph neural network (GNN) accelerating device, comprising:
- an obtaining module configured to receive a root node identifier corresponding to a node in a graph for GNN processing;
- a determining module configured to:
  - determine a plurality of node identifiers for a plurality of nodes in the graph according to locations of the plurality of nodes in the graph relative to the root node;
  - map the plurality of node identifiers respectively to physical memory addresses in a memory, wherein:
    - each of the physical memory addresses in the memory stores attribute data of the node identified by the corresponding node identifier, and
    - each of the physical memory addresses comprises a memory bank identifier of a memory bank, wherein each memory bank stores a plurality of rows, columns, or memory pages;
  - select, based on the memory bank identifiers of the physical memory addresses, a subset of the physical memory addresses that maximizes intra-memory-bank sequential memory access; and
  - de-map the selected subset of the physical memory addresses into corresponding node identifiers to obtain one or more candidate node identifiers; and
- a sampling module configured to sample one or more graph node identifiers at least from the one or more candidate node identifiers for the GNN processing.

* * * * *

UNITED STATES PATENT AND TRADEMARK OFFICE
CERTIFICATE OF CORRECTION

PATENT NO. : 11,886,352 B2
APPLICATION NO. : 17/581609
DATED : January 30, 2024
INVENTOR(S) : Heng Liu et al.

Page 1 of 1

It is certified that error appears in the above-identified patent and that said Letters Patent is hereby corrected as shown below:

In the Claims

Claim 2, Column 24, Lines 42-45:
"wherein the determining a plurality node identifiers for the a plurality of nodes in the graph" should read -- wherein the determining a plurality of candidate node identifiers for a plurality of nodes in the graph --.

Claim 2, Column 24, Line 55:
"determining the one or more candidate node identifiers" should read -- determining one or more candidate node identifiers --.

Claim 11, Column 26, Line 18:
"determine the plurlaity of candidate node identifiers" should read -- determine the plurality of candidate node identifiers --.

Signed and Sealed this
Twenty-third Day of April, 2024

Katherine Kelly Vidal
*Director of the United States Patent and Trademark Office*